July 21, 1953  J. B. OLSON  2,646,022
COMMUNITY LAYING NEST
Filed Feb. 12, 1951  2 Sheets-Sheet 1
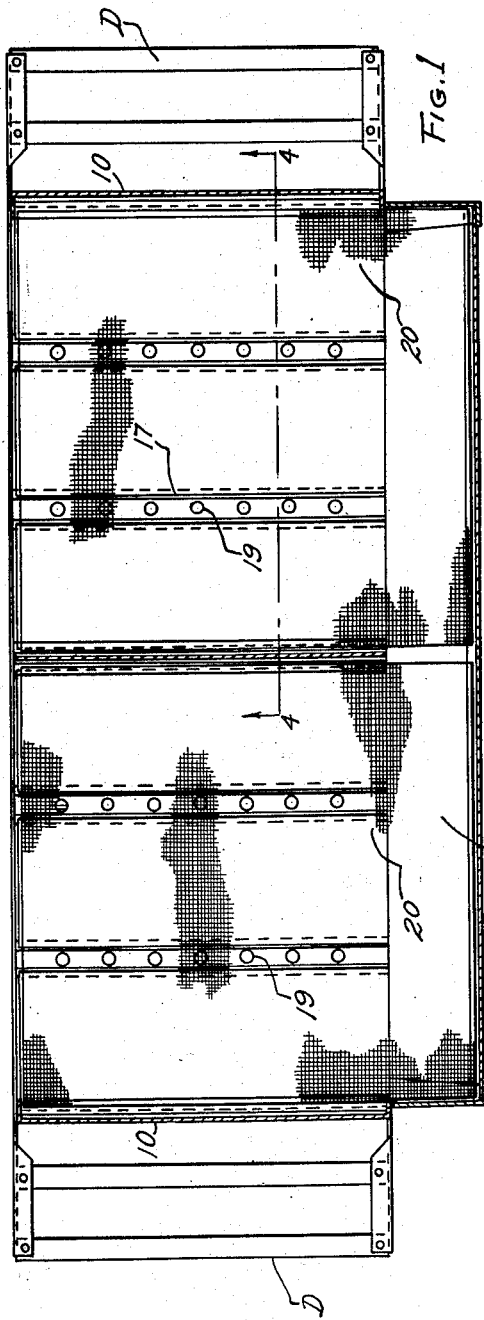
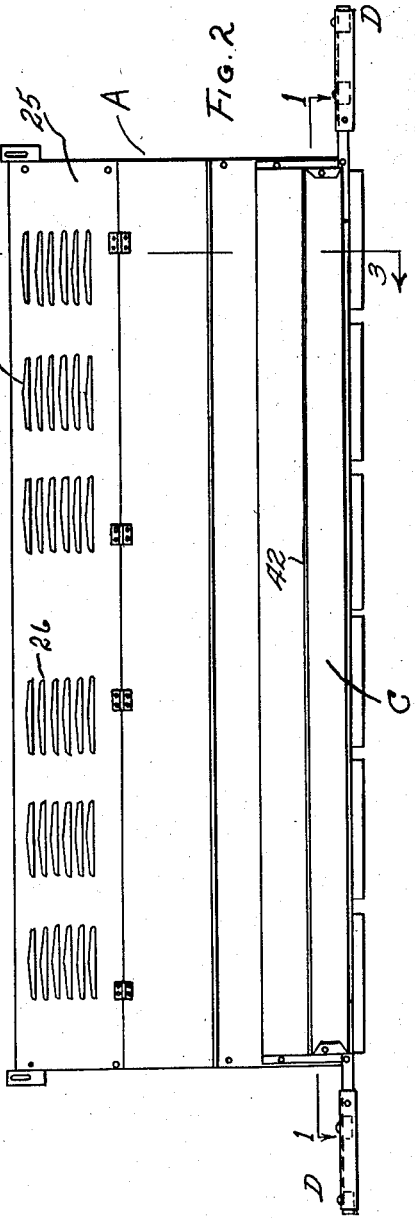
INVENTOR.
JOHN B. OLSON
BY
ATTORNEY July 21, 1953 J. B. OLSON 2,646,022
COMMUNITY LAYING NEST
Filed Feb. 12, 1951 2 Sheets-Sheet 2

INVENTOR.
JOHN B. OLSON
BY
ATTORNEY

Patented July 21, 1953

2,646,022

UNITED STATES PATENT OFFICE 2,646,022

COMMUNITY LAYING NEST

John B. Olson, Fort Atkinson, Wis., assignor to James Manufacturing Company, Fort Atkinson, Wis., a company of Wisconsin Application February 12, 1951, Serial No. 210,493

3 Claims. (Cl. 119—48)

The present invention relates to what may be called a community laying nest, wherein the enclosure is elongated and a fabric curtain is provided forming a nest compartment and a hallway for the length of the enclosure, the curtain having narrow vertically arranged longitudinally spaced openings, the spacing being the width required for a nest, so the hen can peer through the openings and find a place for laying, the lower end of the curtain being largely free so the hen can freely pass from the hallway into the nest compartment and out again.

A novel feature of my device is the egg receiving extension and the removable wire flooring for the hallway and the nest compartment. This floor is inclined toward the egg receiving extension so the eggs will roll from the nest into the extension, thus keeping the eggs clean and prevent the hens from keeping the freshly laid eggs at body temperature for too long a period after laying, because with the wire screen floor they are not inclined to remain very long on the nest.

The egg receiving extension is separated from the nest compartment by a partition which terminates far enough from the wire screen floor so the largest egg will roll thereunder. I furnish a fabric curtain which covers this open space but will not prevent the eggs from rolling into the extension, but will shield the nest compartment from too much light.

A novel feature of applicant's arrangement of the hallway and nest compartment, is that any litter dropped in either will pass through the screen and be caught on the removable sheet metal slide or pan which can be easily cleaned.

Another novel feature of applicant's community nest is the means provided, whereby the nest compartment and hallway are kept comparatively dark, and without interfering with the passage therethrough of fresh air.

Another important object of applicant's design is to provide means, whereby the wire screen may be removed and nesting material placed on the removable sheet metal plates or pans and between inverted channels in the base which are provided with a number of small inlets for fresh air, so the incoming air does not directly impinge the hens on the nest.

Generally stated, objects of the present invention are to provide a very efficient community nest which can be manufactured at low cost.

To these and other useful ends, my invention consists of parts, combinations of parts, or their equivalents, as hereinafter described and claimed in the accompanying drawings in which:

Fig. 1 is a top view of my community nest taken on lines 1—1 of Figure 2.

Fig. 2 is a front view of the device as shown in Figure 3.

Figure 3:
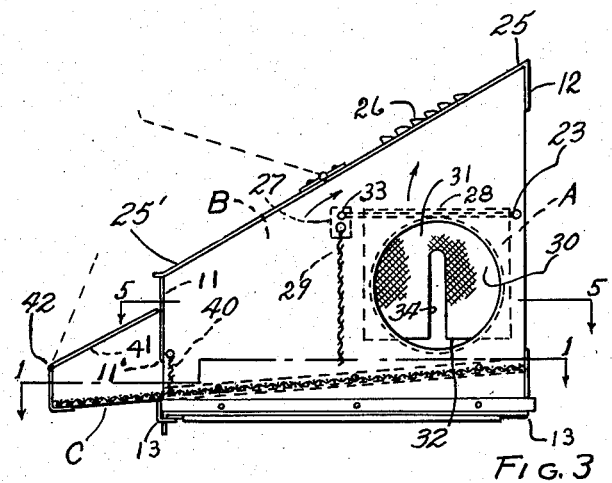
Fig. 3 is a transverse sectional view taken on lines 3—3 of Figure 2.

In the drawings, the hallway and laying compartments are designated by reference characters A and B. The egg receiving compartment is designated in its entirety by reference character C.

Members A and B have end walls 10—10, a front wall 11 and a partial rear wall as at 12—12, the remainder of this rear wall being closed by moving member 12 against a partition or a wall of the coop.

Figure 4:
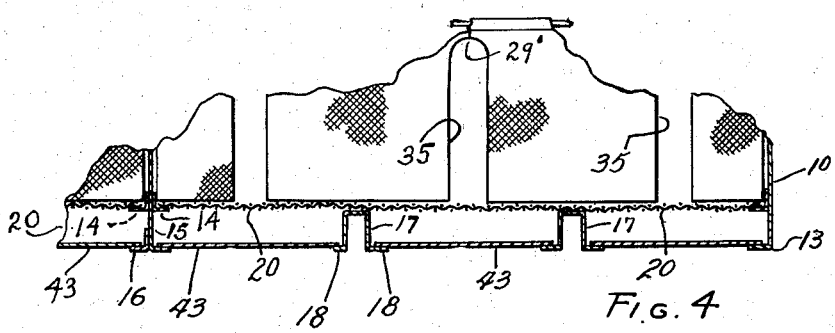
Fig. 4 is a fractional section of the device taken on line 4—4 of Figure 1.
Figure 5:
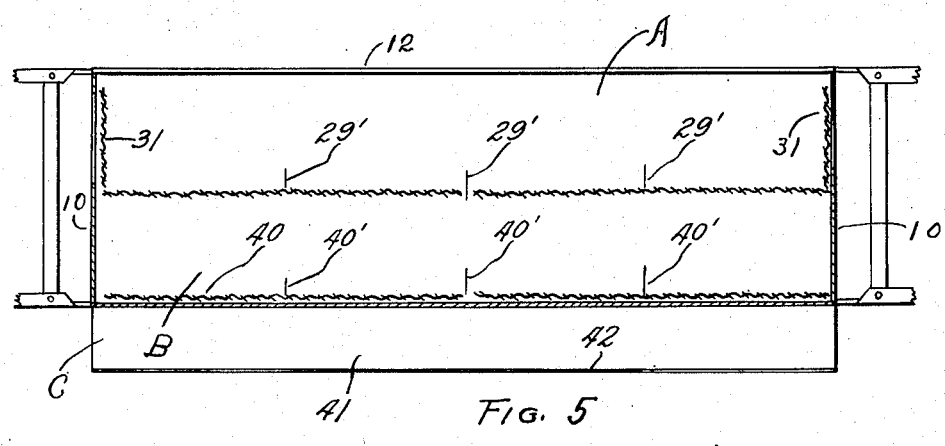
Fig. 5 is a section of the device taken on lines 5—5 of Figure 3.

It will be understood this entire rear portion may be closed by a metal panel which extends from the top to the bottom of the enclosure. The bottom of the end of the rear and front walls terminates as at 13—13. The closure when designed for six nests, has a pair of transverse angle bars 14—14 which embraces an L-shaped depending plate 15, and another L-shaped plate 16 is secured to plate 15 as illustrated in Figure 4. I provide inverted U-shaped members 17, two of which are equally spaced between members 10 and 15, the spacing being about the width of conventional nests; thus it may be said that six nests are preferably provided in compartment B.

Members 17 have outwardly extending flanges 18—18, and having a number of relatively small openings 19 adapted to act as air inlets as will hereinafter appear. Thus it will be seen that members 11 and 12 will be connected together by means of members 10, 14, 15 and 17, the lower lip of members 14 and the top of member 17 answering as a support for screen floor 20—20. Means are provided whereby members 20 are removable.

I provide a cover or roof 25 for my device having preferably relatively small louvres 26 so air will enter openings 19 and pass upwardly through compartments A and B and escape through these louvres. Thus as the air enters A and B, it will be confined to a very narrow space between the nests about the diameter of openings 19. This current of air will be very mild and slow moving so the hens on the nests will not be directly impinged by a harmful air current. I preferably provide a transverse member 27 and preferbly a screen 28 which extends from this member to the rear of member A.

Members A and B are formed into separate compartments by means of preferably a fabric curtain 29 which is attached on its upper edge to member 27 as illustrated terminating at its bottom at or near screen 20.

For convenience and for replacement, fabric curtains 29 and 40 are divided into two or more lengths preferably at 29' and 40' and these curtains including curtains 31 have formed on their top edges a loop adapted to be slid on rods (not shown). Thus if one section of a curtain is injured or if curtain 31 is injured, replacement of the injured curtain is provided for in a convenient manner.

I provide openings 30 in end members 10, and a fabric or cloth curtain 31 which terminates at its bottom as at 32, and is secured at the top to members 10 as at 33. These curtains are provided with slits 34 substantially as shown in Figure 3. Suitable perches are secured to the ends of the enclosure and are designated in their entireties by reference character D so the hens can hop on these perches and enter hallway A through openings 30.

Member 29 is provided with spaced slits 35, one for each nest so a hen can travel along the hallway and peer into the nests through slits 35 and freely enter a nest that is found vacant, and just as freely leave the nest and hallway.

Member 11 terminates as at 11' leaving room so the largest egg may roll into the egg receiving compartment C. I preferably provide a fabric or cloth curtain 40, the bottom of which hangs free a slight distance above screen floor 20, so the eggs will roll freely into the egg compartment.

Hens lay better in a darkened nest and from the foregoing it will be seen that hallway A will be somewhat darkened and that nest compartment B will be further darkened by members 29 and 40, thus to encourage maximum production, by inducing the hens when ready to lay to enter the hallway and laying compartment B. Slits 34 and 35 encourage the hens to peer into the hallway and the compartment and then enter one of the nests, because of curtains 31 and 29 giving the hens a sense of security while they are in the hallway and especially while in the nest compartment and assurance that they are not trapped and can readily leave the nest compartment and hallway.

I will now describe a novel feature of applicant's invention. It will be noted that openings 35 are located midway members 10, 15 and 17. When seeking a nest space, old hens that have been accustomed to individual nests having straw or other material may not take well to the wire screen 20 on which to lay their eggs; although the young laying hens prefer this screen.

I provide means whereby applicant's community nest device may be adapted for use by old laying hens. This change requires only removing screen 20, and supplying straw or the like in the space between members 10, 15 and 17, at least within compartment B, thus providing the kind of laying nests old hens are accustomed to.

Member 25 is provided with a hinged cover 25', the hinge being adjacent member 27. This hinged lid is substantially the width and length of compartment B, so it may be swung open on the hinge exposing all of the nests, so the straw or nest material may be easily supplied or replaced.

It will be seen that the floor of compartments A and B will, in this modification, be plates or pans 43 which are easily removed for cleaning and replaced in preparation for fresh nest material.

Member C is shaped about as shown in the figures and is provided with a lid 41 which is hinged to member 11 as at 42 for convenience in removing the eggs.

The importance of curtain 40 will be appreciated, because without this curtain when lid 41 is raised, there would be a very harmful and disturbing flash of light which would extend into the laying nests, and be confusing to the hens.

It will be seen that applicant has evolved a very simple, easily manufactured at low cost, and efficient community laying nest; that the device can be easily arranged for the use of old or young hens; that the eggs may in either event be easily removed.

It will be understood that floor members 20 may terminate at 11 and a separate suitably positioned floor supplied for member C, and that rear members 12 may extend for the full width of the enclosure, so the enclosure may be differently positioned in the building.

Clearly many minor detail changes may be made in the design shown without departing from the spirit and scope of the appended claims.

Having thus shown and described my invention, I claim:

1. In a community laying nest of the character described comprising in combination, an elongated roofed inclosure having a wire screened floor for the length and width of the enclosure, a longitudinal fabric partition forming a nest and a hallway compartment for the length of the enclosure, openings in the end walls of said enclosure in alignment with said hallway for a passageway from the exterior into and from said hallway, longitudinally spaced transversely positioned channel shaped elements adapted to act as supports for said screen floor, narrow vertically positioned openings in said fabric curtain and extending a distance from the bottom thereof and positioned transversely midway said channels for indicating nest positions between said channels.

2. A device as recited in claim 1 including, said channels being inverted and having a number of relatively small spaced openings in their bases, the top of said fabric curtain terminating a short distance from the enclosure roof, forming an air passageway between the nest and hallway compartments, louvers defining outlet openings in the roof of said inclosure and positioned above said hallway, whereby air may pass through said channel openings and said nest and hallway compartments and escape through said roof openings.

3. A device as recited in claim 1 including, said screen floor being positioned at an angle downwardly toward the outside wall of said nest compartment, defining a narrow opening in the bottom of the side wall of said enclosure adjacent said nest compartment, an egg receiving compartment attached to said enclosure for substantially the length of the enclosure and means whereby eggs will roll by gravity through said narrow opening and into said egg receiving compartment.

JOHN B. OLSON.

References Cited in the file of this patent
UNITED STATES PATENTS

| Number | Name | Date |
|---|---|---|
| 1,914,160 | Pine | June 13, 1933 |
| 1,925,456 | Muehr | Sept. 5, 1933 |
| 2,501,475 | Muehlfeld | Mar. 21, 1950 |
| 2,617,384 | Tjaden et al. | Nov. 11, 1952 |